United States Patent
Nalam Venkat et al.

(10) Patent No.: US 12,392,790 B2
(45) Date of Patent: Aug. 19, 2025

(54) APPARATUS AND METHODS OF IDENTIFYING TUBE ASSEMBLY TYPE

(71) Applicant: Siemens Healthcare Diagnostics Inc., Tarrytown, NY (US)

(72) Inventors: Rayal Raj Prasad Nalam Venkat, Princeton, NJ (US); Benjamin S. Pollack, Jersey City, NJ (US); Yao-Jen Chang, Princeton, NJ (US); Venkatesh NarasimhaMurthy, Hillsborough, NJ (US); Vivek Singh, Princeton, NJ (US); Ankur Kapoor, Plainsboro, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 512 days.

(21) Appl. No.: 17/755,473

(22) PCT Filed: Oct. 22, 2020

(86) PCT No.: PCT/US2020/056929
§ 371 (c)(1),
(2) Date: Apr. 29, 2022

(87) PCT Pub. No.: WO2021/086724
PCT Pub. Date: May 6, 2021

(65) Prior Publication Data
US 2022/0398846 A1 Dec. 15, 2022

Related U.S. Application Data

(60) Provisional application No. 62/929,070, filed on Oct. 31, 2019.

(51) Int. Cl.
*G06F 18/24* (2023.01)
*G01N 35/00* (2006.01)
(Continued)

(52) U.S. Cl.
CPC ......... *G01N 35/00732* (2013.01); *G06T 7/90* (2017.01); *G06V 10/14* (2022.01);
(Continued)

(58) Field of Classification Search
None
See application file for complete search history.

(56) References Cited

U.S. PATENT DOCUMENTS 6,069,696 A * 5/2000 McQueen ............... G01J 3/501
235/383
8,891,862 B1 * 11/2014 Wolk ..................... G06V 30/40
382/199

(Continued)

FOREIGN PATENT DOCUMENTS

CN 209877896 U * 12/2019
JP 2005-182143 A 7/2005
(Continued)

OTHER PUBLICATIONS

Web Page<URL :https://kyurin.co.jp/info/18-001a2.pdf> Jan. 2018.
(Continued)

*Primary Examiner* — Mohammed Rachedine

(57) ABSTRACT

A method of identifying a tube type. The method includes capturing one or more pixelated images of a cap affixed to a tube; identifying a color of one or more pixels of the pixilated image of the cap; identifying one or more gradients of a dimension of the cap; and identifying the tube type based at least on: the color of the one or more pixels, and the one or more gradients of a dimension of the cap. Apparatus adapted to carry out the method are disclosed as are other aspects.

20 Claims, 8 Drawing Sheets

(51) Int. Cl.
*G01N 35/04* (2006.01)
*G06T 7/90* (2017.01)
*G06V 10/14* (2022.01)
*G06V 10/25* (2022.01)
*G06V 10/764* (2022.01)
*G06V 10/82* (2022.01)
*G06V 20/50* (2022.01)

(52) U.S. Cl.
CPC ............ *G06V 10/25* (2022.01); *G06V 10/764* (2022.01); *G06V 10/82* (2022.01); *G06V 20/50* (2022.01); *G06T 2207/10024* (2013.01); *G06T 2207/10048* (2013.01); *G06T 2207/30004* (2013.01); *G06V 2201/03* (2022.01)

(56) References Cited

U.S. PATENT DOCUMENTS

| | | |
|---|---|---|
| 11,035,870 B2 | 6/2021 | Kluckner et al. |
| 2007/0217951 A1* | 9/2007 | Matsumoto ............. B01F 31/10 422/67 |
| 2009/0324032 A1* | 12/2009 | Chen ..................... G06T 7/0008 382/128 |
| 2015/0064740 A1* | 3/2015 | Nagai ..................... G01N 1/30 435/30 |
| 2016/0018427 A1 | 1/2016 | Streibl et al. |
| 2016/0311590 A1 | 10/2016 | Wolfe |
| 2019/0271714 A1 | 9/2019 | Kluckner et al. |

FOREIGN PATENT DOCUMENTS

| | | | |
|---|---|---|---|
| JP | 2009-545032 A | 12/2009 | |
| JP | 2014-194729 A | 10/2014 | |
| WO | 2017/132167 A1 | 8/2017 | |
| WO | WO-2017163117 A1 * | 9/2017 | ....... G01N 35/00732 |
| WO | WO-2018022280 A1 * | 2/2018 | ............. G01N 21/25 |

OTHER PUBLICATIONS

English translation of Japanese Office Action of corresponding Japanese patent Application No. 2022-525249 6 Pages.
PCT International Search Report and Written Opinion dated Jan. 12, 2021 (11 Pages).
https://en.wikipedia.org/wiki/Support-vector_machine#Linear_SVM.
Extended EP Search Report dated Nov. 18, 2022 of corresponding European Application No. 20882210.6, 4 Pages.

* cited by examiner

| Tube | First Cap Standard | Second Cap Standard | Third Cap Standard |
|---|---|---|---|
| First Tube Type | Tan / Clear | Dark Red | Gray |
| Second Tube Type | Tan / Orange | Tan / Orange | Tan / Orange |
| Third Tube Type | Red / Green | Red | Green |

FIG. 6

APPARATUS AND METHODS OF IDENTIFYING TUBE ASSEMBLY TYPE

CROSS REFERENCE TO RELATED APPLICATION APPLICATIONS

This disclosure is a 371 of PCT/US2020/056929, filed Oct. 22, 2020, which claims the benefit of U.S. Provisional Patent Application No. 62/929,070, entitled "APPARATUS AND METHODS OF IDENTIFYING TUBE ASSEMBLY TYPE," filed Oct. 31, 2019, the disclosures of which are hereby incorporated by reference in their entireties for all purposes herein.

FIELD

Embodiments of the present disclosure relate to apparatus and methods of identifying tube assemblies.

BACKGROUND

Automated testing systems may conduct clinical chemistry or assays using one or more reagents to identify an analyte or other constituent in a biological sample (sample) such as blood serum, blood plasma, urine, interstitial liquid, cerebrospinal liquids, and the like. For convenience and safety reasons, these samples are almost always contained in sample tubes (e.g., blood collection tubes). The sample tubes may be capped and in some cases, and the caps may include a color and/or shape that provides information concerning the type of test to be conducted, type of additive contained in the tube (e.g., serum separator, coagulant such as thrombin, or anticoagulant and specific type thereof, like EDTA or sodium citrate, or anti-glycosis additive), and whether the tube is provided with vacuum capability, and the like.

In certain automated testing systems, the sample container and sample are digitally imaged and processed, such as with a computer-aided digital imaging system, so that type and color of the cap can be discerned. During imaging, one or more images of the sample tube (including cap) and sample can be captured.

However, such automated testing systems may, under certain conditions, provide variations in performance and can improperly characterize a tube and/or cap type. Thus, improved methods and apparatus of digitally imaging and processing sample containers and caps are sought.

SUMMARY

In a first embodiment, a method of identifying a tube type is provided. The method includes capturing one or more images of a cap affixed to a tube, the capturing generating a pixilated image of the cap, the pixilated image including a plurality of pixels; identifying a color of one or more pixels of the pixilated image of the cap; identifying one or more gradients of a dimension of the cap; and identifying the tube type based at least on: the color of the one or more pixels, and the one or more gradients of a dimension of the cap.

In a second embodiment, a method of identifying a tube type is provided. The method includes capturing one or more images of a cap, the capturing generating a pixilated image of the cap; identifying a color of the cap; identifying a dimensional gradient of the cap; identifying the tube type based at least on: the color of the cap, and the dimensional gradient; and identifying a match between a test ordered and the tube type.

In a third embodiment, a diagnostic apparatus is provided. The diagnostic apparatus includes an imaging device configured to capture one or more images of a cap assembly comprising a cap affixed to a tube, wherein the one or more images comprise pixelated images of the cap; and a controller communicatively coupled to the imaging device, the controller comprising a processor coupled to a memory, the memory storing executable program instructions that are executable to: determine a color of one or more pixels of the pixilated image of the cap; determine one or more gradients of a dimension of the cap; and identify a tube type based at least on:
the color of the one or more pixels, and
the one or more gradients of the dimension of the cap.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the disclosure in any way. Like numerals are used throughout to denote the same or similar elements.

FIG. 6 illustrates a table of examples of different tube assemblies having different cap colors and cap shapes, but used for the same tests according to one or more embodiments of the disclosure.

DETAILED DESCRIPTION

Figure 1A:
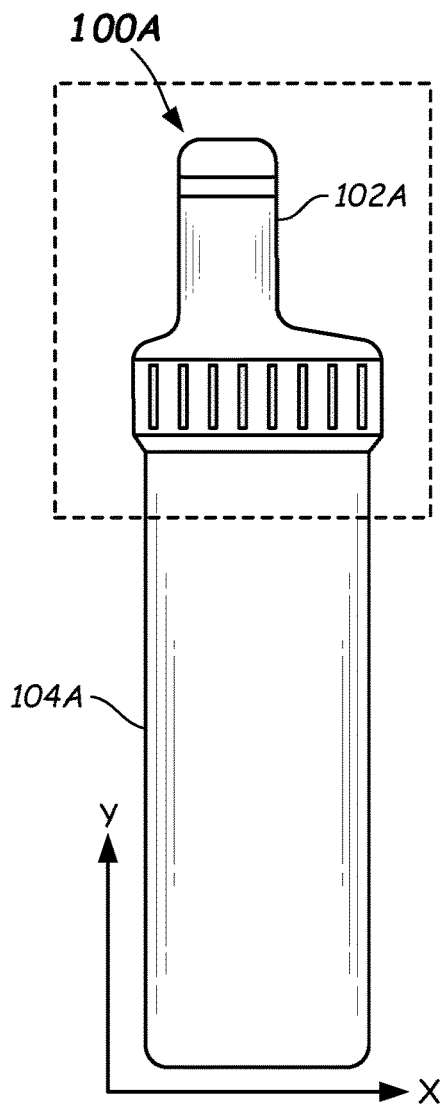
FIG. 1A illustrates a side elevation view of a first tube assembly including a cap attached to a tube and a box indicating a location of a mask image shown in FIG. 2A according to one or more embodiments of the disclosure.

Diagnostic laboratories may use blood collection tubes (e.g., tube assemblies) from various manufacturers to perform a plurality of tests. The tube assemblies may include a tube with a cap attached thereto. Different tube assembly types may have different characteristics, such as different sizes and/or different chemical additives therein. For example, many tube assembly types are chemically active, meaning the tubes contain one or more additive chemicals, which may be used to change a state of the sample or otherwise assist in its processing such as by promoting separation or retaining a property (e.g., anticoagulants, gel separators or cell-free preservatives).

For example, in some embodiments, the inside wall of a tube may be coated with the one or more additives or an additive may be provided elsewhere in the tube. For example, the type of additive contained in the tube may be a serum separator (e.g., separating gel), a coagulant such as thrombin and the like, an anticoagulant like sodium heparin, sodium lithium, EDTA, potassium EDTA, $K_2$EDTA, $K_3$EDTA, or sodium citrate 1:9 or 1:4, acid citrate dextrose (ACD), sodium polyanethanol sulfonate (SPS), and the like, an anti-glycosis additive such as a combination of sodium fluoride and sodium potassium oxalate and the like, or other additives such as a cell-free preservative, or the like, for changing, inhibiting, or retaining a characteristic of the sample or aiding in its processing. The tube manufacturers may associate the color of the cap of the tube assemblies with a specific type of chemical additive in the tube. Some colors may indicate the presence of a serum separator gel combined with another additive such as an anticoagulant or a clot activator.

Moreover, different manufacturers may have their own standards associating features of the tube assemblies, such as cap color and cap shape with a particular property of a tube assembly, which may be related to the contents of the tube or possibly whether the tube is provided with vacuum capability. In some embodiments, the manufacturers may include a label indicating the contents of the tube, but these labels may be occluded in some instances. In some embodiments, the diagnostic apparatus may read the labels.

For example, a manufacturer may associate all tube assemblies with light green colored caps with tubes including lithium heparin configured to test glucose, electrolytes such as sodium and potassium, cholesterol, and some enzymes and markers for example. Caps with lavender color may identify tubes containing EDTA and derivatives (an anticoagulant) configured to test hematology (e.g., white cells, platelet count, and hemoglobin). Other cap colors such as yellow, gold, light blue, white, grey, orange, red, and black may be used and may have various meanings. In some embodiments, a manufacturer may use different colored caps for the same tube types. The labs use this color information for further processing of the tubes. Furthermore, since some tubes can include chemically active agents (usually lined with substances like coagulants, anticoagulants, or anti-glycolytic compounds), it becomes important to associate which tests can be run on which tube types because tests are almost always content-specific. Confusion with the tube types may cause undefined or errant results, such as a tube for urine being used to process (e.g., test) a different body fluid, or a tube having a coagulant used for a test requiring an anticoagulant, for example.

FIG. 6 illustrates a table of examples of different tube assemblies having different cap colors and cap shapes, but used for the same tests. Cap colors and cap shapes are shown for three different tube types and three different cap standards. As shown in FIG. 6, a first tube type may have the same cap shape (e.g., a first cap shape) for all three cap standards, but different cap colors for the three cap standards. For example, the first cap standard may be clear with a tan stripe, the second cap standard may be dark red, and the third cap standard may be gray. In the embodiment of FIG. 6, the three cap standards of the second tube type may use the same cap shape, the first cap shape, and the same color, orange with a tan stripe. A third tube type may use different cap shapes and colors for the three cap standards. For example, the first cap standard may use the first shape and may be green with a red stripe, the second cap standard may use the second cap shape and may be red, and the third cap standard may use the second cap shape may be green.

Figure 7:
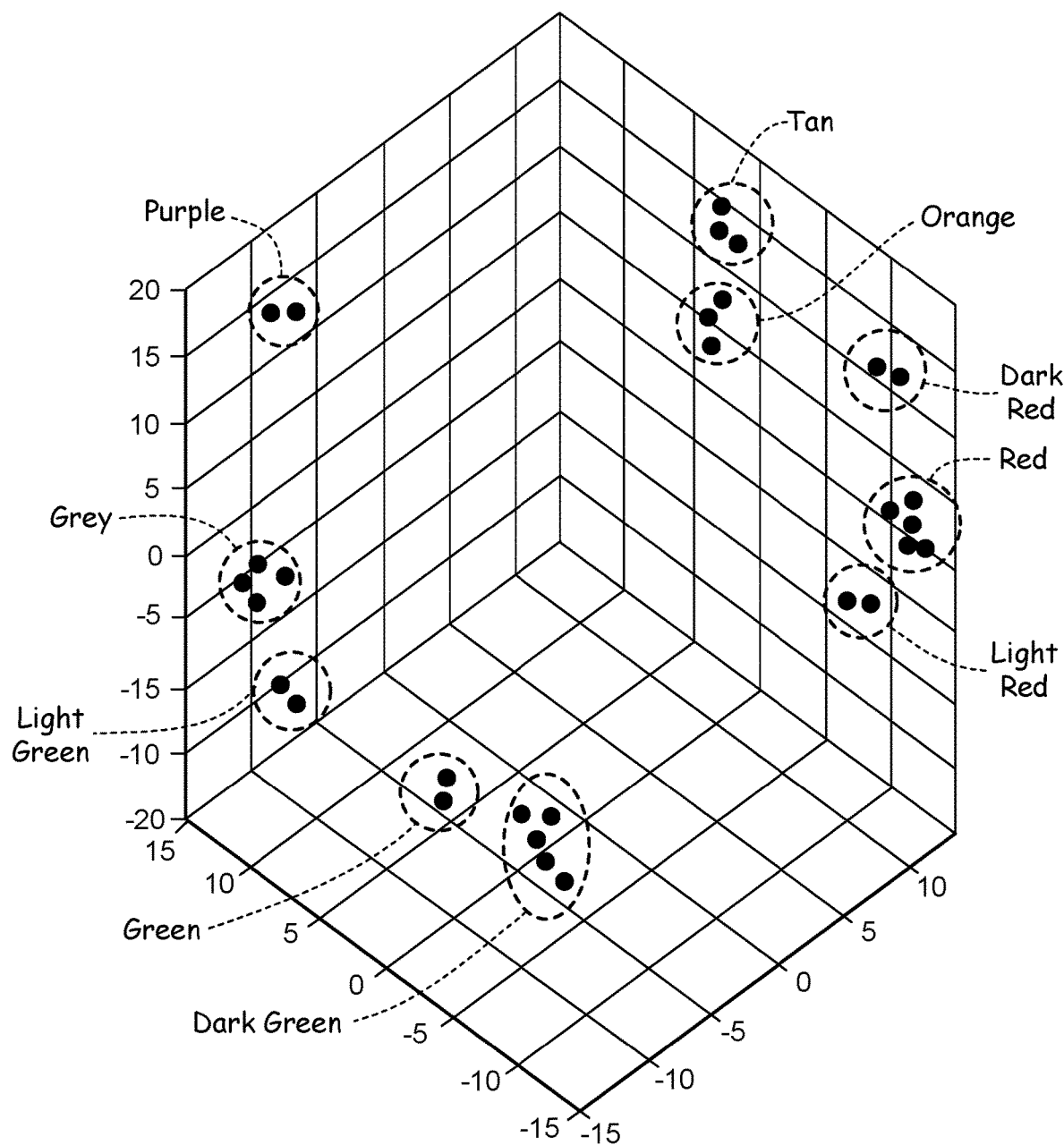
FIG. 7 illustrates an LDA (linear discriminant analysis) plot in HSV color space that tries to rely purely on color (for a set of tube types across various manufacturers) to separate tube types according to one or more embodiments of the disclosure.

FIG. 7 illustrates an LDA (linear discriminant analysis) plot in HSV color space that tries to rely purely on color (for a set of tube types across various manufacturers) to differentiate the tube types as much as possible. The points in plot of FIG. 7 illustrate different cap colors, such as cap colors of different tube types and cap colors from different manufacturers. As shown, not all tube types can be easily differentiated in HSV color space. For example, in the second cap standard of FIG. 6, the first tube type has a dark red cap and the third tube type has a red cap. It may be difficult for machines to differentiate the dark red cap from the red cap and, thus the first tube type from the third tube type using HSV color space. In the third cap standard of FIG. 6, the first tube type is gray and the third tube type is green. It may be difficult for machines to differentiate the gray cap from the green cap and, thus the first tube type from the third tube type using HSV color space.

As shown in FIG. 7, detecting the colors of the caps alone often does not provide enough information to accurately identify tube types because of the different standards that manufacturers may use. More accurate tube type identification, as disclosed herein, involves identifying features beyond the colors of the caps. Embodiments described herein enable differentiation between tube assembly types to properly identify certain properties of a tube irrespective of the cap color, such as vacuum capability. In particular, embodiments described herein can identify tube assembly types even in situations where different tube assembly types have similar cap colors.

More particularly, embodiments disclosed herein may differentiate between tube assembly types including different tube functionalities and/or additive compositions by detecting various cap characteristics, which may include at least the color of the cap and geometric features of the cap and/or of the tube.

The methods and apparatus described herein may enable a machine such as an imaging apparatus or quality check module to properly identify and robustly distinguish between various tube assembly types even when cap color itself may not provide enough information for certain identification. The methods and imaging apparatus described herein may use artificial intelligence, deep learning techniques, statistical models, and/or other like discriminative models to classify tube types based on color, shape, and/or other characteristics of the caps of tube assemblies.

In some embodiments, statistical models and/or discriminative models may include support vector machines (SVMs), decision trees, convolutional neural networks (CNNs), and the like, which can include previously-trained models. The processes described herein may be performed by a processor coupled to memory, wherein the memory has stored therein executable program instructions that are executable on a suitable processor to perform the methods. In some embodiments, an SVM is a supervised learning model with associated learning algorithm(s) that analyzes data used for classification and regression analysis.

In a first broad aspect, embodiments of the present disclosure provide imaging methods and apparatus configured to, and capable of, being operated (operable) to determine physical features of a cap and/or a tube, such as the one or more geometrical features indicative of shape and color of the cap and/or the tube. In some embodiments, the gradient of one or more dimensions of the cap may be determined and used. These characteristics of a cap and/or a tube may be used by a machine (e.g., an imaging apparatus or quality check module) using machine learning techniques to identify and/or classify different tube assemblies.

The methods and apparatus disclosed herein may use cap geometry, cap color, and other characteristics of the cap and the tube to distinguish between different tube types. The methods and apparatus may use front and/or back illumination of tube assemblies to identify the characteristics of the tube assemblies. For example, in some embodiments a light source, such as a panelized light source, may illuminate a front surface of a tube assembly and an image of the reflected light from the front surface may be captured. In other embodiments, one or more light sources, such as panelized light sources, may back illuminate a tube assembly and an imaging device may capture an image of the light passing through the tube assembly, and may enable characterizing a translucence of the cap. In some circumstances, front illumination may provide improved discrimination of at least color of the cap.

Capturing one or more images of a tube assembly generates one or more pixilated images of the tube assembly, wherein each pixilated image includes a plurality of pixels forming the image. The one or more images may be analyzed to extract geometrical features of the tube and/or the cap, which may be used to identify the tube type on which the cap is attached. For example, the features of the tube and/or the cap may be input to a discriminative model, such as a linear support vector machine, to identify the cap. The tube type may, in some embodiments, be at least partially identified based on the identification of the cap.

In some embodiments, further processing of the image in an area identified as cap may, using a color-determining algorithm, extract or identify a color of the cap. In some embodiments, color values for each of the pixels representing the cap may be identified. The mean of the color values (mean color) of all or a patch of the pixels may be determined, such as by using the computer algorithm. The color components of the mean color may then be determined. In some embodiments, the mean color may be converted to HSV (hue, saturation, value) color space to yield color hue, saturation, and value components. An example of tubes assemblies mapped in HSV color space is provided in FIG. 7. These color components provide three dimensions or vectors that may be input to a discriminative model to help clearly identify the tube type. Other color characterizing methods may be used, such as by using HSL, RGB (red, green, blue), Adobe RGB, YIQ, YUV, CIELCAB, CIELUV, ProPhoto, sRGB, Luma plus Chroma, CMYK, or the like.

In some embodiments, features related to cap geometry may be input to the discriminative model. For example, geometric features related to a dimension of the cap, such as a gradient (e.g., row gradients and/or column gradients) may be input to the discriminative model. A gradient as used herein is a rate of change of a dimension of the cap (a first order derivative). An algorithm may scan (e.g., raster scan) the image of the cap from top to bottom or from bottom to top, for example, to determine the width of the cap as a function of vertical position (e.g., along a y-axis), wherein the determined widths are calculated along a horizontal axis or x-axis.

For example, the algorithm may scan the image of the cap from top to bottom, analyze the shape of the cap, and store both the absolute values of the widths and the first-order numerical derivative along the y-axis of the image of the cap. The first order numerical derivative may be calculated by equation (1) as follows, which is for a single axis:

$$\frac{\delta u_{i,j}}{\delta y} = \frac{u_{i,j+1} - u_{(i,j-1)}}{2\Delta y} \qquad \text{Equation (1)}$$

wherein:
$u_{i,j}$ is the two-dimensional value of u at location index i,j
i is the x-axis location index,
j is the y-axis location index,
$\delta u_{i,j}/\delta y$ is the numerical derivative of u at location i,j with reference to the y-axis, and
$\Delta y$ is the change in dimension in the vertical dimension.

Equation (1) yields row gradients. The maximum value of the row gradient, referred to as RG-max, may be calculated. The value of RG-max is a function of, and related to, a sharpest change in the width of the cap and may be a vector input to the discriminative model. In other embodiments, other geometric features of the cap may be analyzed and input into the discriminative model. For example, dimensional or shape contours along a top surface of the cap may be analyzed and input to the discriminative model. In other embodiments, gradients of cap height may be analyzed and input to the discriminative model, i.e., rate of change of cap height as a function of width.

In some embodiments, the material of the cap may be analyzed to obtain another differentiating characteristic that may be input to the discriminative model. Analyzing the cap material may include computing a measure of the opacity or translucence of the cap. For example, an algorithm may use one or more back-illuminated images of the cap. In some embodiments, back illuminated images of the cap may be captured at high exposure times across multiple spectra (wavelength) of light and the images may analyzed by the algorithm. In some embodiments, the three visible light spectrums (RGB) may be used. For example, back-illuminated red-channel images may be exposed for about 10,309 µs, back-illuminated green-channel images may be exposed for about 20,615 µs, and back-illuminated blue-channel images may be exposed for about 10,310 µs. Statistics for each of the wavelength channels may be computed and input into the discriminative model. For example, the mean value of the high-exposure image of each wavelength of RGB may be computed. With these three mean values (R-mean, G-mean and B-mean), the discriminative model may use a multi-dimensional discriminative feature space for cap identification. For example, a 7-dimensional discriminative feature space (H, S, V, RG-max, R-mean, G-mean, B-mean) may be used for cap identification. However any combination of color feature spaces may be used.

In an n-dimensional feature space (n=7 in this embodiment), a discriminative model (e.g., a discriminator) can be trained to properly identify the cap and thus the tube type. An example of a discriminator is a linear support vector machine (SVM), which draws decision hyper-boundaries around each cap and/or tube type in high dimensional feature space. The cap and/or tube type may then be identified. In some embodiments, more features, such as cap height, cap diameter, tube diameter, and/or tube height, or other vision-based features may be included as additional dimensional or shape inputs into the discriminatory model. Cap weight may be utilized also, such as at a de-capping station after the imaging stage. In other embodiments, other back-illuminated or non-visible light (e.g., IR or near IR) may be used to add more powerful discriminatory models to leverage the dimensional complexity of the color space.

The models and algorithms described herein may associate specific caps types with their appropriate tube types without relying solely on the colors of the cap. The models and algorithms may perform these tasks without input from operators, i.e., the discrimination can be fully automated. The following description provides an example of implementing the above-described methods and apparatus to distinguish tube types based on caps attached to the tubes. In other embodiments, characteristics of the tube assemblies may be analyzed and the models and algorithms may determine tube types based on the analysis.

Further details of methods and apparatus are described with reference to FIGS. 1A to 8 herein.

Figure 1B:
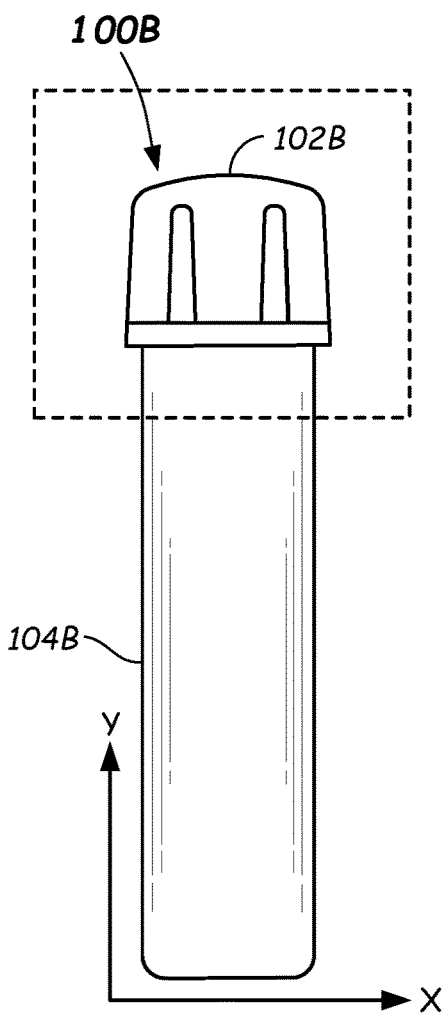
FIG. 1B illustrates a side elevation view of a second tube assembly including a cap attached to a tube and a box indicating a location of a mask image shown in FIG. 2B according to one or more embodiments of the disclosure.

Reference is now made to FIGS. 1A and 1B. FIG. 1A illustrates a side elevation view of a first tube assembly 100A including a first cap 102A attached atop a first tube 104A. FIG. 1B illustrates a side elevation view of a second tube assembly 100B including a second cap 102B attached atop a second tube 104B. The first tube assembly 100A may be from a first manufacturer and the second tube assembly 100B may be from a second manufacturer, for example, or may simply be different tube types from the same manufacturer. The first tube assembly 100A may include one or more chemical additives (not shown) located in the first tube 104A that are used in the performance of a first test and the second tube assembly 100B may include one or more chemical additives (not shown) located in the second tube 104B that are used in the performance of a second test. Referring to the first tube assembly 100A, the chemical additive may be added as a spray-coated layer in the first tube 104A, as a pellet or localized mass, or elsewhere in the first tube 104A or in or on the underside of the first cap 102A. A chemical additive may be in similar locations in the second tube assembly 100B. In some embodiments, the first test may be the same as the second test and in other embodiments the first test may be different than the second test.

The first cap 102A may have a first color and the second cap 102B may have a second color. Some caps may have more than one color, such as one color on one portion of the cap and a second color on another portion of the cap. In some embodiments, the first color may so similar to the second color such that a color-only computer algorithm may not be able to distinguish the first color from the second color. In other embodiments, the first color may be different than the second color. The methods and apparatus described herein may analyze the above-described dimensional and/or shape features and colors to distinguish the first cap 102A from the second cap 102B and thus the tube type of the first tube assembly 100A from the tube type of the second tube assembly 100B.

Figure 2A:
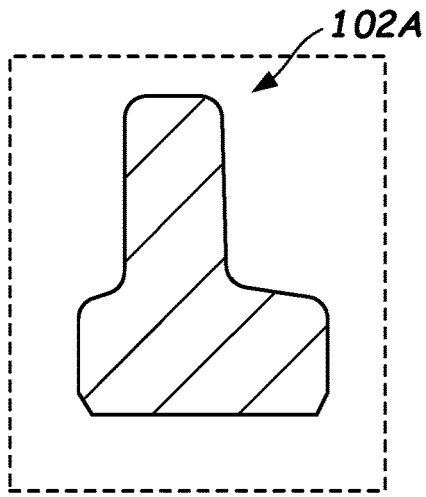
FIG. 2A is a schematic diagram of a mask image of a first cap of a first tube assembly including a box indicating the location of where the mask image aligns with the first tube assembly of FIG. 1A according to one or more embodiments of the disclosure.
Figure 2B:
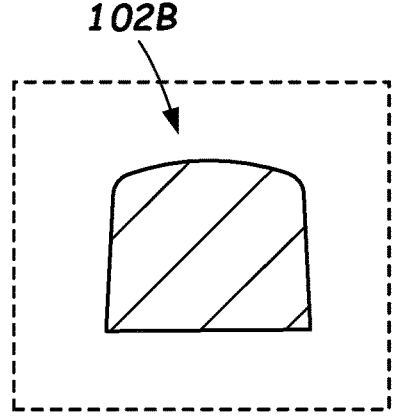
FIG. 2B is a schematic diagram of a mask image of a second cap of a second tube assembly including a box indicating the location of where the mask image aligns with the second tube assembly of FIG. 1B according to one or more embodiments of the disclosure.
Figure 8:
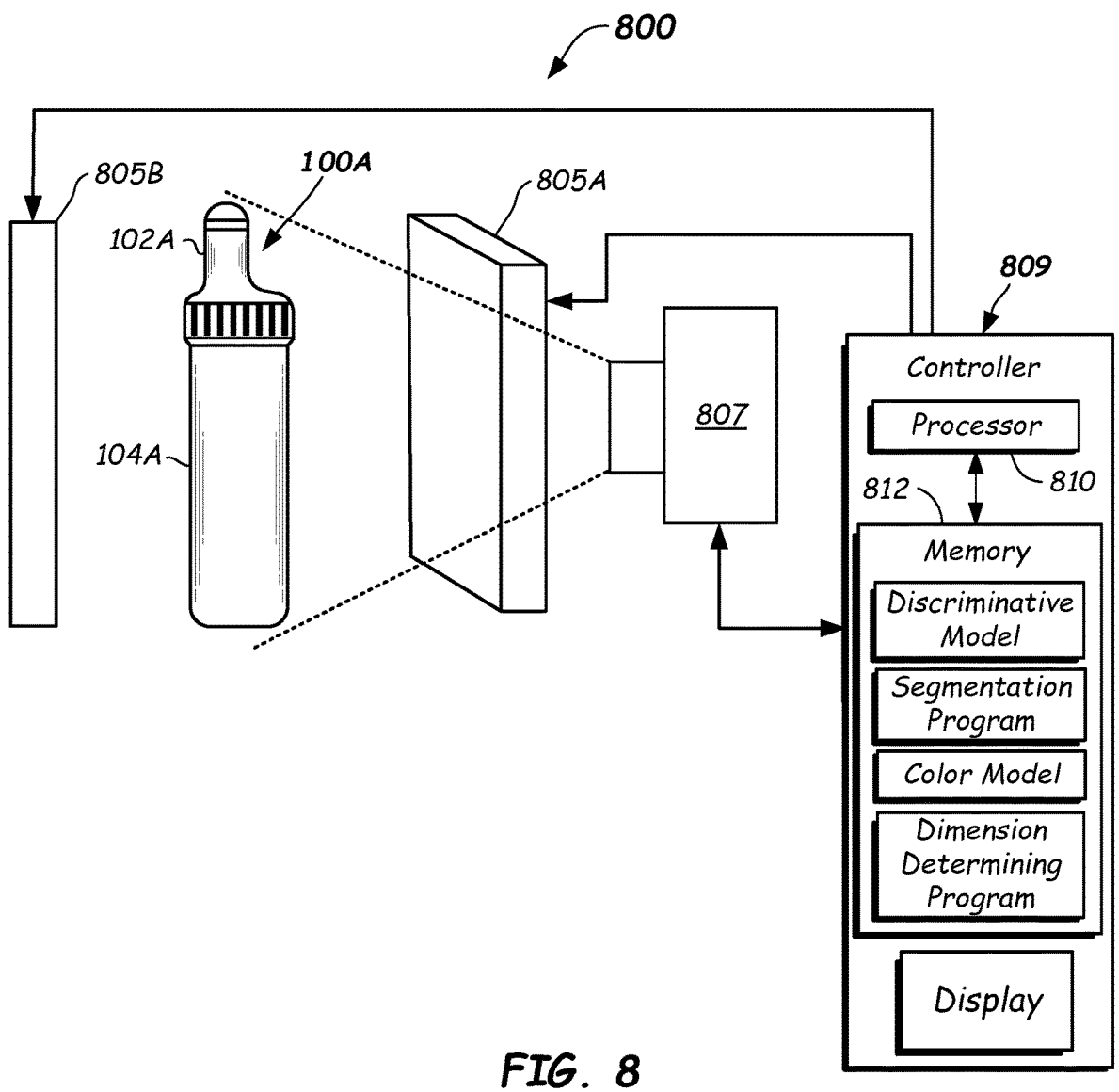
FIG. 8 illustrates a schematic side view diagram of a diagnostic analyzer adapted to image a tube assembly and discriminate cap and tube type according to one or more embodiments of the disclosure.

One or more images of the first tube assembly 100A and the second tube assembly 100B may be captured by an imaging device 800 (FIG. 8). The images may be pixilated images made up of multiple rows and columns of pixels, wherein each image includes a plurality of pixels. Additional reference is made to FIGS. 2A and 2B, wherein FIG. 2A illustrates a schematic diagram of a mask image of the first cap 102A removed from the image of the first tube 104A and FIG. 2B illustrates a schematic diagram of a mask image of the second cap 102B removed from the second tube 104B. In some embodiments, algorithms executing on a computer may classify the pixels in the images as being the caps and this classification may be used to isolate those pixels classified as cap for additional processing as shown in FIGS. 2A and 2B. The boxes around FIGS. 2A and 2B indicate where the mask images align with the first tube assembly 100A of FIG. 1A and the second tube assembly 100B of FIG. 2B, which include like boxes. The sizes (width and height) of the boxes and location of the boxes may be made of a size and location needed to capture any expected cap type provided on any size tube.

The pixel locations in the image of FIG. 2A (shown hatched) may be used to analyze the original color image to determine a color of the first cap 102A. Determining the color of the first cap 102A may be performed by calculating mean color of the pixels, median color of the pixels, a mode value of the pixel, or other color values of the pixels. More advanced un-supervised machine learning methods such as k-means clustering may also be used to create color clusters. The mean color may be computed in HSV color space to generate three color feature dimensions of the HSV color model (H-Hue, S-Saturation, and V-Value (brightness)) for input to the discriminative model of the first tube assembly 100A. The same process may be applied to the pixels in FIG. 2B (shown hatched) to generate three color feature dimensions of the second cap 102B for input to the discriminative model of the second tube assembly 100B.

Additional dimensions for input to the discriminative model may be obtained by analyzing geometric features of the first tube assembly 100A including the first cap 102A and/or the first tube 104A and the second tube assembly 100B including the second cap 102B and/or the second tube 104B. Algorithms executing on the computer may identify steep color intensity transitions to identify edges and then analyze dimension gradients, such as row gradients of the first cap 102A and may include portions of the first tube 104A. Likewise, the algorithms may analyze dimension gradients, such row gradients of the second cap 102B and may include portions of the second tube 104B.

Figure 3A:
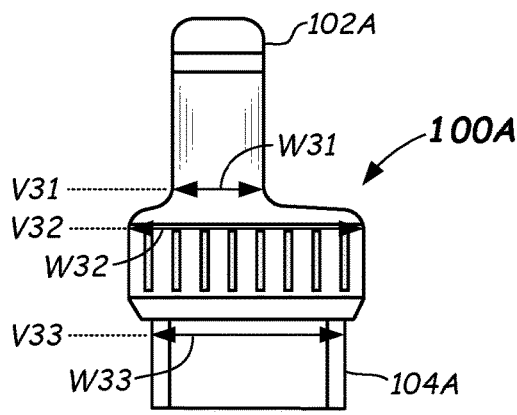
FIG. 3A illustrates a side elevation view of portions of a first tube assembly that may be analyzed to determine multiple row gradients according to one or more embodiments of the disclosure.
Figure 4A:
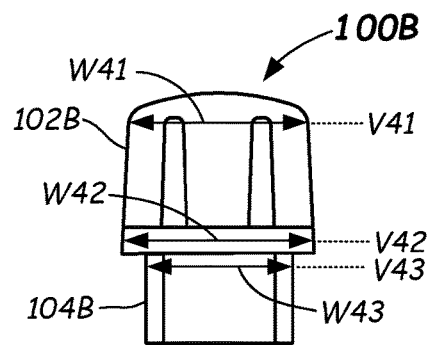
FIG. 4A illustrates a side elevation view of portions of a second tube assembly that may be analyzed to determine multiple row gradients according to one or more embodiments of the disclosure.

Reference is made to FIG. 3A, which illustrates portions of the first tube assembly 100A that may be analyzed to determine geometrical gradients, such as row gradients. Reference is also made to FIG. 4A, which illustrates portions of the second tube assembly 100B that may be analyzed to determine geometrical gradients, such as row gradients. Referring to FIG. 3A, the algorithm may scan the first cap 102A and a portion of the first tube 104A from top to bottom (or bottom to top) to determine numerical values indicative of the shape of the first cap 102A and a portion of the first tube 104A. In the embodiment of FIG. 3A, the numerical values are various widths of the first cap 102A and a top portion of the first tube 104A. These numerical values may be based on image color intensity changes that identify edges of the first cap 102A and the first tube 104A. Optionally, a segmentation routine may be used to identify the border of the cap in pixel space.

Figure 3B:
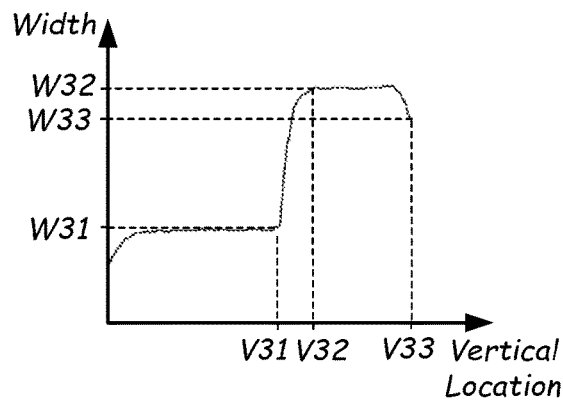
FIG. 3B graphically illustrates a profile of the width of an upper portion of the first tube assembly of FIG. 3A according to one or more embodiments of the disclosure.

Additional reference is made to FIG. 3B, which graphically illustrates the various width dimensions (x dimension) as a function of vertical dimension (Y dimension) along the first tube assembly 100A shown in FIG. 3A. As shown in FIGS. 3A and 3B, the first tube assembly 100A has a width W31 at a vertical location V31 and a width W32 at a vertical location V32. The first tube assembly 100A has a width W33 at a vertical location V33, which is the width of the first tube 104A. These widths may represent unique geometric properties of the first tube assembly 100A in terms of width as a function of vertical location.

Figure 3C:
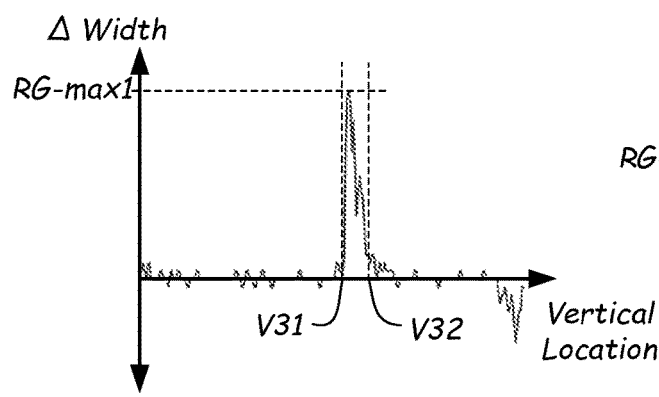
FIG. 3C graphically illustrates the first order derivative of the graph of FIG. 3B according to one or more embodiments of the disclosure.

Additional reference is made to FIG. 3C, which illustrates the first order derivative of the dimensional plot of FIG. 3B (width dimension vs. vertical dimension) of first tube assembly 100A. Equation (1) may be applied to the graph of FIG. 3B to yield the graph of FIG. 3C. It is noted that the topmost rows of the first cap 102A may be ignored during processing, so the first order derivative does not approach infinity when equation (1) is applied to the topmost rows. The y-axis of the graph of FIG. 3C is referred to as ΔWidth. A maximum value of ΔWidth, referred to as RG-max1, is shown on the graph of FIG. 3C and may be input into the discriminative model of the first tube assembly 100A as another model input in addition to color.

Figure 4B:
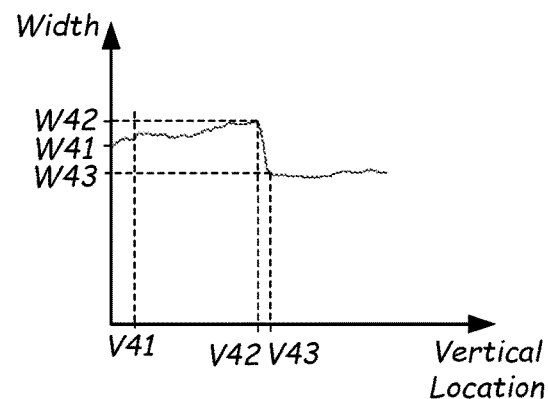
FIG. 4B graphically illustrates a profile of the width of an upper portion of the second tube assembly of FIG. 4A according to one or more embodiments of the disclosure.

Additional reference is made to FIG. 4B, which graphically illustrates the various widths (x dimensions) of the second tube assembly 100B shown in FIG. 4A as a function of vertical dimension (Y dimension). As shown in FIGS. 4A and 4B, the second tube assembly 100B has a width W41 at a vertical location V41 and a width W42 at a vertical location V42. The second tube assembly 100B has a width W43 at a vertical location V43, which is the width of the second tube 104B. These widths represent unique geometric properties of the second tube assembly 100B.

Figure 4C:
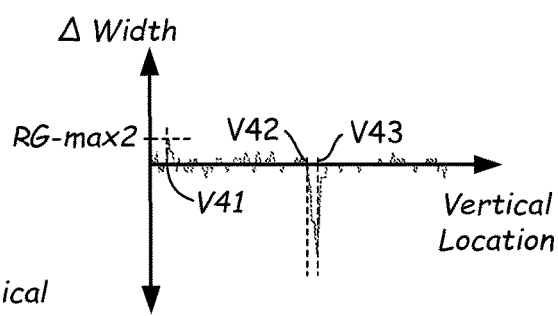
FIG. 4C graphically illustrates the first order derivative of the graph of FIG. 4B according to one or more embodiments of the disclosure.

Additional reference is made to FIG. 4C, which illustrates the first order derivative of the second tube assembly 100B as plotted on the graph of FIG. 4B. Equation (1) may be applied to the graph of FIG. 4B to yield the graph of FIG. 4C. It is noted that the topmost rows of the second cap 102B may be ignored during processing, so the first order derivative does not approach infinity when the derivative of the first rows are calculated. The y-axis of the graph of FIG. 4C is referred to as ΔWidth. A maximum peak value of ΔWidth, referred to as RG-max2, is shown on the graph of FIG. 4C and may be input into the discriminative model of the second tube assembly 100B as another model input. In some embodiments, one or more minimum value of ΔWidth may be used as a model input along with color.

Based on the foregoing, the gradients of the first tube assembly 100A and the second tube assembly 100B may be used to identify and/or distinguish at least some features of the tube assemblies irrespective of the colors of the first cap 102A and the second cap 102B. For example, it may be able to distinguish vacuum capability by discrimination of cap gradients. In some embodiments, gradients of cap width of the first cap 102A and the second cap 102B may be used to distinguish at least some features of the first tube assembly 100A and the second tube assembly 100B, respectively.

Another differentiating characteristic in the first tube assembly 100A and the second tube assembly 100B may be the cap material and/or the tube material, which may be determined by computing a measure of opacity or translucence. To measure this characteristic, portions of the tube assemblies, including the caps, may be back illuminated and images of the tube assemblies may be captured, such as at high exposure times, and may also be captured using illumination at multiple light spectra. In some embodiments, the three visible light spectra (red (R), green (G), and blue (B)) may back-illuminate the first tube assembly 100A and the second tube assembly 100B. However, other colors may be used and even including UV and IR back lighting may be used. For example, the first tube assembly 100A and the second tube assembly 100B may be illuminated using non-visible light.

Figure 5A:
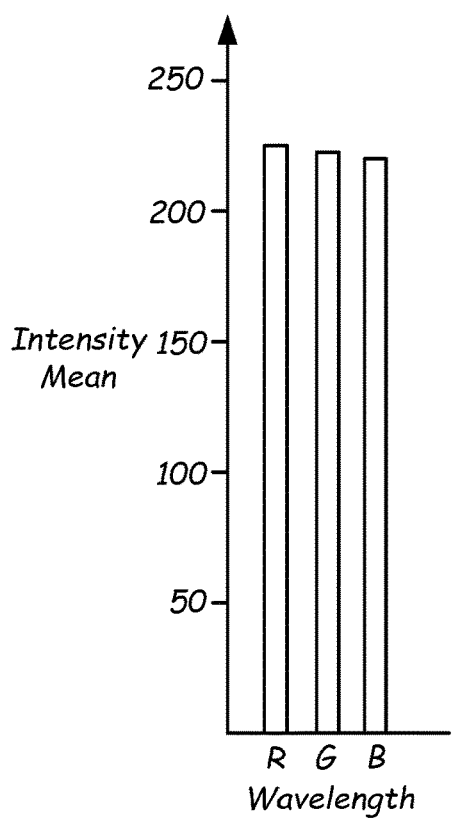
FIG. 5A graphically illustrates a bar chart plot of a spectrum of light (wavelength vs. mean intensity) that passes through a first tube assembly according to one or more embodiments of the disclosure.
Figure 5B:
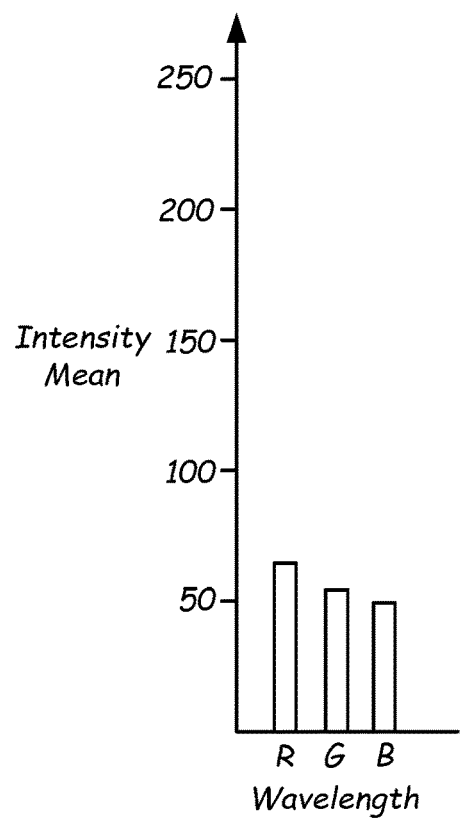
FIG. 5B graphically illustrates a bar chart plot of a spectrum of light (wavelength vs. mean intensity) that passes through a second tube assembly according to one or more embodiments of the disclosure.

Reference is made to FIG. 5A, which illustrates a graph of example light spectra passing through the first cap 102A of first tube assembly 100A and captured by an imaging device (e.g., 107A of FIG. 8). Reference is also made to FIG. 5B, which illustrates a graph of example light spectra passing through the second cap 102B of the second tube assembly 100B and captured by an imaging device. The graphs of FIGS. 5A and 5B are graphed on an intensity scale (e.g., mean intensity) from 0 to 255, wherein 0 is no received light and 255 represents no light being blocked by a tube assembly. In some embodiments, the back-illuminated red-channel images may be exposed for about 10,309 μs, the back-illuminated green-channel images may be exposed for about 20,615 μs, and the back-illuminated blue-channel images may be exposed for about 10,310 μs. Other exposures may be used.

Figures 5C, 5D:
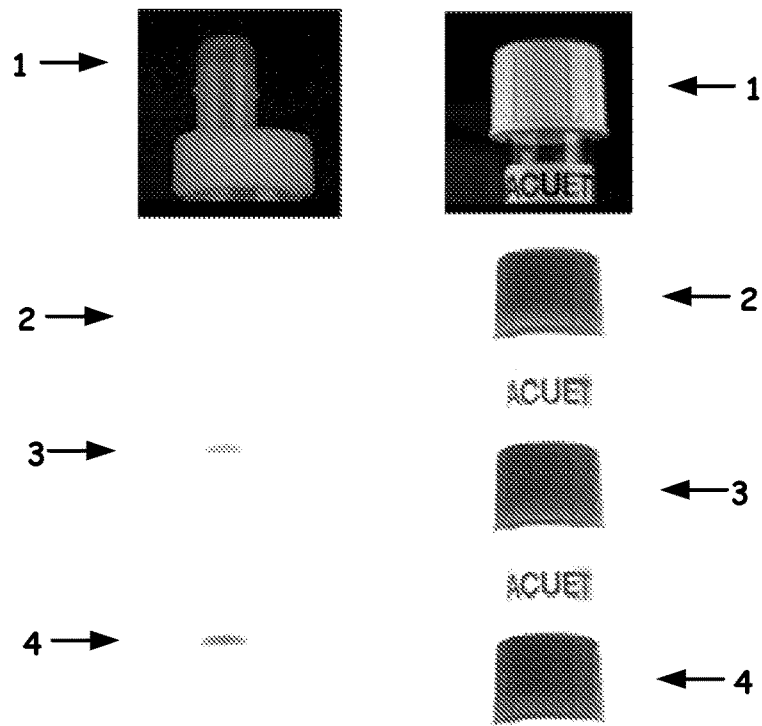
FIG. 5C illustrates photographic images of a portion of a back-illuminated, first tube assembly that yielded the graph of FIG. 5A according to one or more embodiments of the disclosure.
FIG. 5D illustrates photographic images of a portion of a back-illuminated, second tube assembly that yielded the graph of FIG. 5B according to one or more embodiments of the disclosure.

Additional reference is made to FIG. 5C, which illustrates photographic images, one above the other, of a portion the first tube assembly 100A. The top photographic image (labeled 1) is a portion of the first tube assembly 100A captured with foreground illumination with a full RGB color spectrum. The second through fourth monochromatic photographic images illustrate transparency of the tube portion to different wavelengths (e.g., colors) of light. For example, the second monochromatic photographic image (labeled 2) is a portion of the first tube assembly 100A captured with red background illumination. The third monochromatic photographic image (labeled 3) is a portion of the first tube assembly 100A captured with green background illumination. The fourth monochromatic photographic image (labeled 4) is a portion of the first tube assembly 100A captured with blue background illumination.

Additional reference is also made to FIG. 5D, which illustrates photographic images one above the other, of a portion the second tube assembly 100B. The top photographic image is a portion of the second tube assembly 100B captured with foreground illumination in a full RGB color spectrum (labeled 1). The second monochromatic photographic image (labeled 2) is a portion of the second tube assembly 100B captured with red background illumination. The third monochromatic photographic image (labeled 3) is a portion of the second tube assembly 100B captured with green background illumination. The fourth monochromatic photographic image (labeled 4) is a portion of the second tube assembly 100B captured with blue background illumination.

From the graphs of FIGS. 5A and 5B, it is shown that the portion of the first tube assembly 100A, labeled 1, has almost full transparency in all of the wavelengths (R, G, B) and the portion of the second tube assembly 100B, labeled 1, blocks a large amount of light at all three wavelengths. In some embodiments, a mean value for each wavelength of the high-exposure images is calculated and is respectively referred to as R-mean, G-mean, and B-mean. In some embodiments, a median value for each wavelength of the high-exposure images is calculated.

When all the above-described feature values are calculated, there can be a 7-dimensional discriminative feature space (H, S, V, RG-max, R-mean, G-mean, B-mean) for each tube assembly. In an n-dimensional feature space (n=7 in this embodiment), the discriminative model can be trained to properly identify various tube types. An example of a discriminator is a linear SVM, which draws decision hyper-boundaries around each tube type in this high dimensional feature space. Based on the foregoing model, the first tube assembly 100A may be distinguished from the second tube assembly 100B, even if the first cap 102A and the second cap 102B have exactly the same or similar colors. With more optical features, such as cap opacity or translucence, cap weight, cap vertical height, diameter, cap gradient(s), or other vision-based geometrical features, or additional image types, such as different back illumination or illumination using non-visible light (e.g., IR or near IR), an even more powerful discriminatory model may be used to leverage the dimensional complexity of the space. Any combination of color space features and geometrical features can be used for cap type discrimination.

The apparatus and methods described herein enable diagnostic labs to differentiate many different tube types that may pass through the labs. Solely relying on the colors of the cap could lead to unreliable results because of the different manufacturer and/or region-specific standards. Based on the foregoing, the apparatus and methods disclosed herein improve discrimination of and help distinguish between various tube types when cap color itself is not enough to distinguish between the various tube types. This is advantageous because it enables a diagnostic device or machine to determine the tube type (and hence, corresponding features) within the diagnostic device or apparatus without requiring any manual input from the operator, i.e., it can be fully automated.

In some embodiments, some corresponding features may be manually input by the operator or obtained via another sensor. The technical features that contribute to the advantages of the apparatus and the methods described herein can include a high-dimensional feature vector for each tube type using data collected from one or more on-board image capture devices or sensors and a discriminative model in high-dimensional space to properly determine the tube type. Use of such a high-dimensional discriminative model may speed up the sample processing workflow and can correctly identify mismatch between a test ordered and the tube type used. Thus, a check may be made to ensure that the proper tube type is being used based on its chemical additive or geometrical properties as identified by the cap.

FIG. 8 illustrates an imaging device 800 that is configured to capture one or more images of the first tube assembly 100A made up of the first cap 102A and the first tube 104A, wherein the one or more images may be pixilated images made up of pixels, wherein each image includes a plurality of pixels. The imaging device 800 may also be referred to as a diagnostic apparatus. The imaging device 800 includes a front light source, such as the light source 805A, which may be a light panel. In some embodiments, more than one light source may be used, such as light panels positioned at either lateral front side of an imaging device 807. Another front light source, such as a light panel, may be provided on the other lateral front side of the imaging device 807 (out of the paper as shown) at the same longitudinal location as the light source 805A. In some embodiments, one or more back light sources, such as the light source 805B, may be provided. The light source 805B may be one or more light panels that provide light for determining opacity, for example. Other arrangements are possible.

The imaging device 800 may further include a controller 809 communicatively coupled to the image device 807 and the light sources 805A, 805B. The controller 809 may be any suitable computer including a processor 810 and a memory 812 suitable to store and execute executable program instructions, such as in the form of a discriminative model. The controller 809 may send signals to the light sources 805A, 805B at appropriate times to provide front lighting and/or backlighting depending on the type of image being captured (back lighted or front lighted). The controller 809 may identify the first cap 102A and the first tube 104A by any suitable segmentation program, such as a CNN or other trained model.

Once the first cap 102A and its representative area is identified, a color thereof may be determined by a color model in any suitable color space, such as HSV color model. Other suitable multi-element color space or models may be used, such as HSL, RGB (red, green, blue), Adobe RGB, YIQ, YUV, CIELCAB, CIELUV, ProPhoto, sRGB, Luma plus Chroma, CMYK, or other suitable color space models. Likewise, once the first cap 102A and the first tube 104A are identified, a dimension determining program or routine may determine the width and/or height of the first tube 104A and/or the gradients of that dimension (e.g., width as a function of cap height and/or height as a function of width). These values may be input into any suitable identification model (e.g., discriminative model) to determine the type of the first tube assembly 100A.

Figure 9:
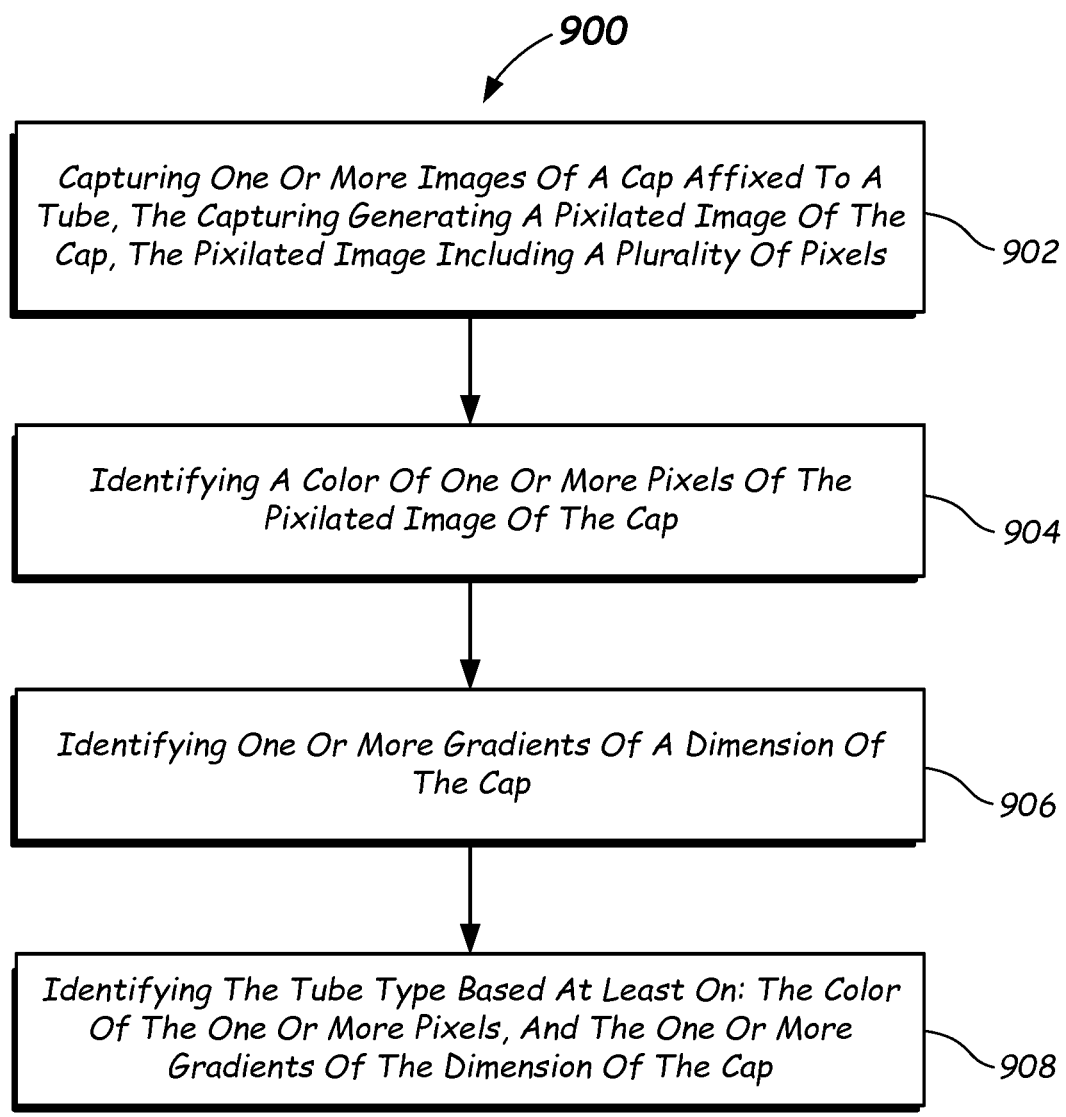
FIG. 9 is a flowchart of a method of identifying a tube type according to one or more embodiments of the disclosure.

Reference is now made to FIG. 9, which is a flowchart of a method 900 of identifying a tube type. The method 900, includes, in 902, capturing one or more images of a cap (e.g., the first cap 102A) affixed to a tube (e.g., the first tube 104A), the capturing generating a pixilated image of the cap, the pixilated image including a plurality of pixels. The method 900 includes, in 904, identifying a color of one or more pixels of the pixilated image of the cap. The method 900 includes, in 906, identifying one or more gradients of a dimension of the cap. The method 900 includes, in 908, identifying the tube type based at least on: the color of the one or more pixels, and the one or more gradients of a dimension of the cap.

Figure 10:
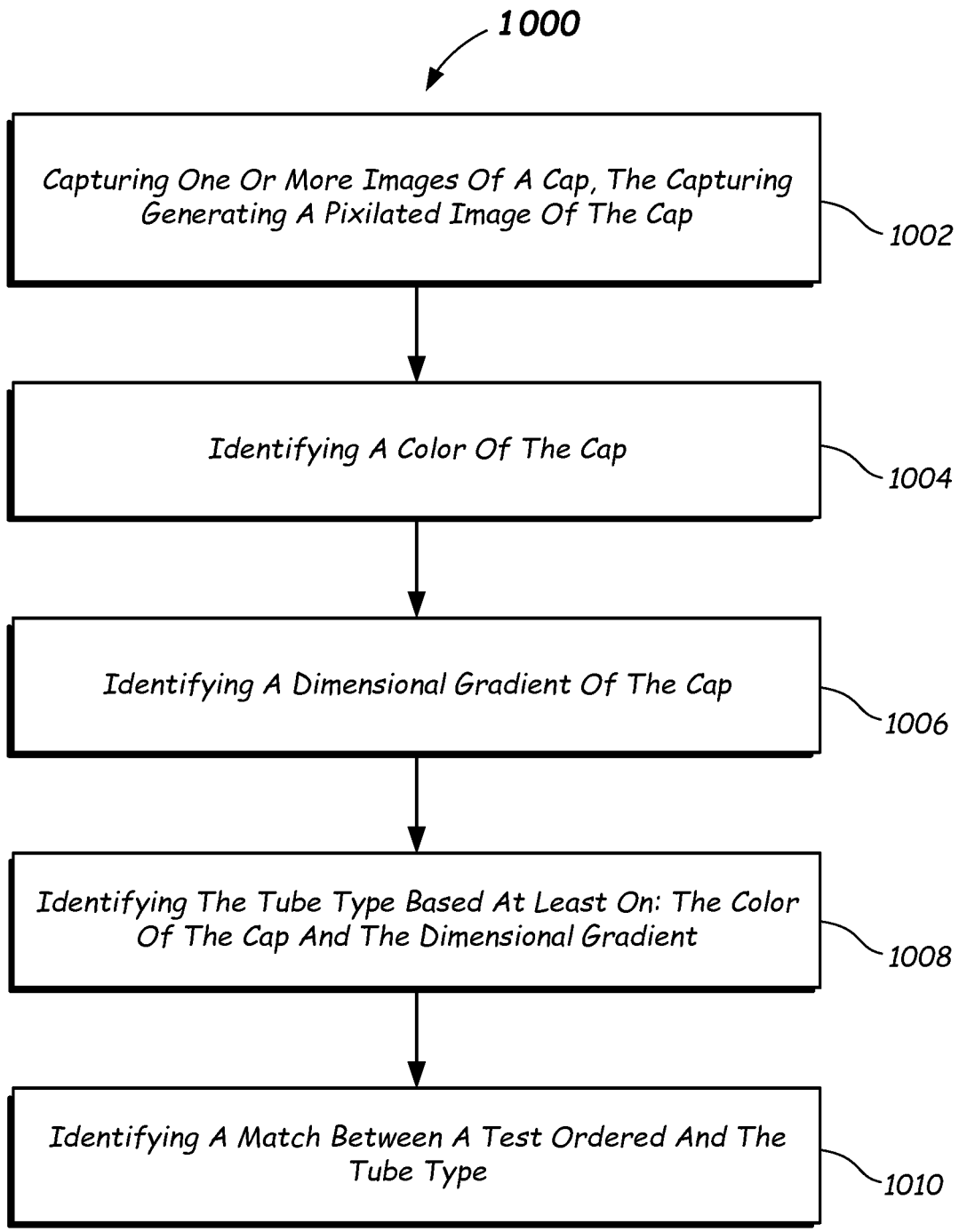
FIG. 10 is a flowchart of another method of identifying a tube type according to one or more embodiments of the disclosure.

Reference is now made to FIG. 10, which is a flowchart of a method 1000 of identifying a tube type. The method 1000 includes, in 1002, capturing one or more images of a cap (e.g., the first cap 102A), the capturing generating a pixilated image of the cap. The method 1000 includes, in 1004, identifying a color of the cap. The method includes, in 1006, identifying a dimensional gradient of the cap. The method 1000 includes, in 1008, identifying the tube type based at least on: the color of the cap, and the dimensional gradient. The method includes, in 1008, identifying a match between a test ordered and the tube type. If the tube type is appropriate for the ordered test then the controller 809 may indicate "proper tube type used" on the display or otherwise report no error in the tube type used. If a mismatch is indicated, then the system may report an error, such as by indicating on the display or otherwise that the "wrong tube type" was used.

While the disclosure is susceptible to various modifications and alternative forms, specific embodiments and methods thereof have been shown by way of example in the drawings and are described in detail herein. It should be understood, however, that it is not intended to limit the disclosure to the particular systems or methods disclosed, but, to the contrary, the intention is to cover all modifications, equivalents and alternatives falling within the scope of the claims.

What is claimed is:

1. A method of identifying a tube type, comprising:
capturing one or more images of a cap affixed to a tube,
the capturing generating a pixilated image of the cap,
the pixilated image including a plurality of pixels;
identifying a color of one or more pixels of the pixilated image of the cap;
identifying one or more gradients of a width or height dimension of the cap; and
identifying the tube type based at least on:
the color of the one or more pixels, and
the one or more gradients of the width or height dimension of the cap.

2. The method of claim 1, wherein the identifying the tube type is based on a discriminative model.

3. The method of claim 2, wherein one or more inputs to the discriminative model comprise a width and/or height of the tube.

4. The method of claim 2, wherein one or more inputs to the discriminative model comprise the one or more gradients of the width or height dimension of the cap.

5. The method of claim 2, wherein an input to the discriminative model comprises capturing images when illuminated using non-visible light comprising IR or near IR.

6. The method of claim 2, wherein an input to the discriminative model comprises a combination of color feature spaces.

7. The method of claim 2, wherein an input to the discriminative model comprises a combination of color feature spaces and discriminative feature space comprising the one or more gradients of the width or height dimension of the cap.

8. The method of claim 2, wherein the discriminative model is a linear support vector machine.

9. The method of claim 1, wherein identifying a color of one or more pixels of the pixilated image of the cap comprises utilizing cap opacity or translucence and backlighting.

10. The method of claim 1, wherein identifying the color of the one or more pixels comprises calculating a mean color of a plurality of pixels in the pixilated image of the cap.

11. The method of claim 1, wherein identifying the color of the one or more pixels is determined by a color space model in a multi-element color space selected from one or more from a group of: HSV, HSL, RGB, Adobe RGB, YIQ, YUV, CIELCAB, CIELUV, ProPhoto, SRGB, Luma plus Chroma, and CMYK.

12. The method of claim 1, wherein identifying the color of the one or more pixels comprises calculating a mean color of a plurality of pixels of the cap in the pixilated image and identifying hue (H), saturation (S), and value (V) components of the mean color in HSV color space.

13. The method of claim 1, wherein the one or more gradients of the width or height dimension of the cap comprise one or more width gradients.

14. The method of claim 13, wherein the one or more width gradients comprises a maximum value of the width gradients.

15. The method of claim 1, wherein the one or more gradients of the width or height dimension of the cap comprise multiple gradients of cap width or cap height.

16. The method of claim 1, comprising identifying a match or mismatch between a test ordered and the tube type.

17. The method of claim 1, further comprising:
identifying a material of the cap; and
identifying the tube type based at least on:
the material of the cap;
the color of the cap, and
the width or height dimensional gradient.

18. A method of identifying a tube type, comprising:
capturing one or more images of a cap affixed to a tube,
the capturing generating a pixilated image of the cap,
the pixilated image including a plurality of pixels;
identifying a color of one or more pixels of the pixilated image of the cap;
identifying one or more gradients of a dimension of the cap; and
identifying the tube type based at least on:
the color of the one or more pixels, and
the one or more gradients of the dimension of the cap;
wherein:
the identifying the tube type is based on a discriminative model; and
an input to the discriminative model comprises cap weight.

19. A method of identifying a tube type, comprising:
capturing one or more images of a cap affixed to a tube,
the capturing generating a pixilated image of the cap,
the pixilated image including a plurality of pixels;
identifying a color of one or more pixels of the pixilated image of the cap;
identifying one or more gradients of a dimension of the cap; and
identifying the tube type based at least on:
the color of the one or more pixels, and
the one or more gradients of the dimension of the cap;
wherein:
the identifying the tube type is based on a discriminative model; and
an input to the discriminative model comprises a 7-dimensional discriminative feature space comprising hue (H), saturation(S), value (V), maximum value of row gradient (RG-max), R-mean, G-mean, and B-mean.

20. A diagnostic apparatus, comprising:
an imaging device configured to capture one or more images of a tube assembly comprising a cap affixed to a tube, wherein the one or more images comprise one or more pixelated images of the cap; and
a controller communicatively coupled to the imaging device, the controller comprising a processor coupled to a memory, the memory storing executable program instructions that are executable to:
determine a color of one or more pixels of the one or more pixilated images of the cap;
determine one or more gradients of a width or height dimension of the cap; and
identify a tube type based at least on:
  the color of the one or more pixels, and
  the one or more gradients of the width or height dimension of the cap.

* * * * *